UNITED STATES PATENT OFFICE 2,473,406

DIOL COMPOUNDS AND ESTERS THEREOF

Carl N. Zellner, New Providence, and Herbert B. Granholm, Westfield, N. J., assignors to Tide Water Associated Oil Company, Bayonne, N. J., a corporation of Delaware No Drawing. Application October 17, 1946, Serial No. 703,722

4 Claims. (Cl. 260—488)

The present invention relates to a novel group of chemical compounds, esters thereof, and methods for preparation of such chemical compounds. More particularly, the invention is concerned with a novel group of 1,4 glycols having a hydrocarbon radical of at least two carbon atoms attached to the carbon atom in the number four position of the glycols, esters of such 1,4 glycols, and methods of preparation of such novel compounds.

The 1,4 glycols embodied by the present invention, i. e., glycols having a hydrocarbon radical of at least two carbon atoms attached to the carbon atom in the number four position of the glycol, may be prepared, in accordance with our practice of the invention, by catalytic hydrogenation of lactones. The novel glycols, thus provided, are illustrated by the following formula:

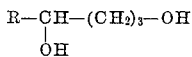

wherein R is a hydrocarbon radical, such as an alkyl group, containing at least two carbon atoms.

In our practice of the invention, it has been found satisfactory to employ gamma lactones for hydrogenation to the novel 1,4 glycols, such as the gamma lactones obtained from unsaturated fatty acids which are either naturally occurring or readily available from pyrolysis reactions. Thus, for example, undecylenic acid, such as derived from pyrolysis of castor oil, is a suitable starting material for providing gamma-undecalactone from which, in accordance with the present invention, 1,4 undecanediol may be prepared.

Generally speaking, therefore, the novel 1,4 glycols containing a hydrocarbon radical of at least two carbon atoms attached to the carbon atom in the number four position in the glycol, are prepared by catalytic hydrogenation, under pressure, of gamma lactones. The hydrogenation pressures employed are generally at least about 500 pounds per square inch and preferably, from about 1000 to 2500 pounds per square inch, as use of higher pressures, under otherwise similar conditions for reaction, enables the reaction to more quickly reach completion. The catalysts that may be satisfactorily employed in practicing our invention are catalysts, such as are known to those skilled in the art, suitable for hydrogenation reactions. Such catalysts include copper chromite promoted with barium, zinc chromite, and the like. When the hydrogenation reaction has been substantially completed, the hydrogenate is filtered and distilled whereby the 1,4 glycol is separated from any lower boiling alcohol that may be formed by hydrogenolysis at the secondary carbon atom. Another method that may be employed, particularly when it is desired to obtain the 1,4 glycol in substantially chemically pure form, is to separate the 1,4 glycol from monoalcohols that may have formed by hydrogenolysis, by esterifying the hydrogenate with a monoacid, such as caproic acid, whereby the monoalcohol in the hydrogenate is converted to a monocaproate and the glycol to the dicaproate. Thereafter, the mono and di-caproates may be separated by distillation to provide esters of the 1,4 glycols.

In order to further illustrate the invention, the following example is set forth relating to a preferred embodiment of our invention, i. e., 1,4 undecanediol, such as provided from gamma undecalactone:

130 grams of commercial undecalactone (washed with sodium carbonate) were hydrogenated at about 280° C. in the presence of 5% by weight of copper-chromium oxide catalyst, for approximately 5 hours, the initial pressure of the hydrogen being about 1950 pounds per square inch. The catalyst employed is prepared in accordance with the method set forth by Folkers and Connor in J. A. C. S. 54, 1138 (1932). The hydrogenate obtained from the foregoing reaction was vacuum distilled into several cuts, which on being tested by the boron-fluoride-acetic acid method, known to those skilled in the art, showed presence of alcohol hydroxyl groups in the cuts. One cut consisted predominantly of monoalcohol and another cut was substantially all comprised of a diol which was identified as 1,4 undecanediol as illustrated by the following methods employed for such identification:

(a) The combined distillates obtained from the hydrogenate in the foregoing hydrogenation reaction were esterified with caproic acid catalyzed with a minor amount of naphthalene sulfonic acid. The caproic esters obtained were vacuum distilled whereby the monoesters were separated from the difunctional esters. Of two ester cuts obtained the higher boiling cut boiled at 180–195° C., at one millimeter pressure; this cut had an ester value of 5.2 milliequivalents per gram and a molecular weight of 380, and consisted essentially of the dicaproate of 1,4 undecanediol which formed during the pressure hydrogenation according to the following equation:

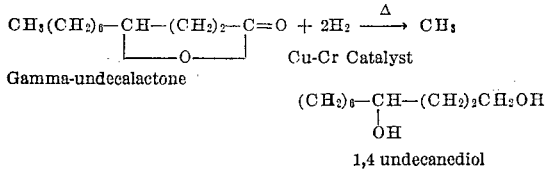

Gamma-undecalactone $(CH_2)_6—CH—(CH_2)_2CH_2OH$
  |
  OH 1,4 undecanediol (b) The dicaproate obtained by esterification of the combined distillates, as set forth in the preceding paragraph, was subjected to alkali saponification in hot ethyl alcohol and the liberated undecanediol extracted from the soap solution by isopropyl ether. The isopropyl ether was evaporated off by means of a steam bath leaving the residual 1,4 undecanediol. The 1,4 undecanediol was found to contain a negligible amount of ester, i. e., about 0.1 milliequivalent per gram, and was subjected to further saponification treatment whereby the ester was removed yielding a substantially ester-free undecanediol. A sample of the undecanediol was subjected to concentrated nitric acid oxidation in the presence of vanadium oxide catalyst and yielded a white crystalline material which melted at 165° C. and, with succinic acid, had a mixed melting point of 182° C. The crystalline material from the nitric acid oxidation of the glycol was succinic acid, establishing the 1,4 structure of the diol, in verification of the equation:

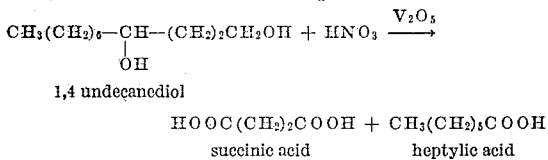

1,4 undecanediol $HOOC(CH_2)_2COOH + CH_3(CH_2)_5COOH$
  succinic acid         heptylic acid (c) The diol obtained by the hereinbefore set forth catalytic hydrogenation of undecalactone was further identified as 1,4 undecanediol by determining the hydroxyl group content of the diol. Determination of the hydroxyl group content of the diol by the method known to those skilled in the art as the boron-fluoride-acetic acid method gave a value of 10.6 milliequivalents per gram which is equal to the calculated value of undecanediol. In addition to the foregoing, the diol was identified as 1,4 undecanediol by molecular weight determination of the diol. In measuring the effect of the diol on the freezing point of camphor, a value of 180 was obtained, which approximates the calculated molecular weight of 1,4 undecanediol.

The results of the hereinbefore mentioned oxidation reaction, determination of hydroxyl group content and molecular weight of the diol formed by catalytic hydrogenation of gamma undecalactone definitely established the diol as 1,4 undecanediol which is a somewhat viscous, nearly colorless liquid having a faintly sweet odor, a refractive index of $N^{20}D = 1.4550$, a specific gravity of 0.89 at 25° C., insoluble in water and soluble in heptane, ether, alcohol and the like. The novel compositions of the present invention having the general structural formula

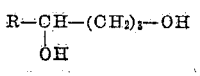

wherein R is a hydrocarbon radical containing at least two carbon atoms, such as in 1,4 undecanediol, have been found to be particularly suitable materials for condensation with carboxylic acids to provide esters having excellent plasticizing properties. Thus, for example, the novel 1,4 glycols provided by the present invention may be esterified with a carboxylic acid, such as caproic acid, to provide esters having the following structures and exhibiting excellent plasticizing properties, particularly for cellulose derivatives such as cellulose acetate:

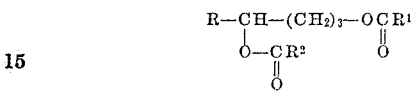

wherein R is a hydrocarbon radical containing at least two carbon atoms and $R^1$ and $R^2$ are the same or different hydrocarbon radicals. More specifically, a novel ester provided by condensation of a 1,4 diol, such as undecanediol, with a carboxylic acid, such as caproic acid, has the formula:

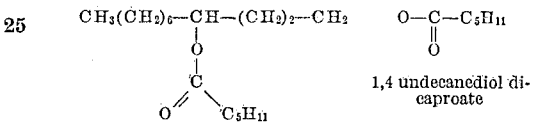

1,4 undecanediol dicaproate

Generally speaking, the esters of the 1,4 glycols having a hydrocarbon radical of at least two carbon atoms attached to the carbon atom in the number four position of the glycol, are prepared by reacting the diol with an excess of an organic acid until esterification is complete. More specifically, and in order to further illustrate the preparation of the novel esters provided by the present invention, the following example is set forth relating to preparation of 1,4 undecanediol dicaproate from 1,4 undecanediol, such as prepared in accordance with the catalytic hydrogenation method set forth herein:

90 grams of the hydrogenate of undecalactone are refluxed for several hours at 205° C. in the presence of 114 grams of caproic acid until the theoretical amount of water is collected. The refluxed hydrogenate is then fractionated into the following cuts after a forerun removing excess caproic acid:

Cut I—containing the monoester, undecyl caproate, having a boiling point of 150 to 155° C. at one millimeter pressure, and a saponification value of 3.6 milliequivalents per gram (theoretical saponification value for undecyl caproate being 3.7).

Cut II—containing the dicaproate of 1,4 undecanediol, having a boiling point of 180 to 195° C. at one millimeter pressure, and a saponification value of 5.2 milliequivalents per gram, equal to the theoretical saponification value for dicaproate of 1,4 undecanediol.

As stated hereinbefore, the novel esters provided by the present invention have excellent plasticizing properties, particularly for cellulose derivatives such as cellulose acetate. For such purposes, it is preferable to employ esters of 1,4 diols having a long chain hydrocarbon radical, such as a heptyl radical, attached to the number four position carbon atom of the diol, as the long chain hydrocarbon radicals provide for increased effectiveness in plasticizing characteristics of the ester. Thus, for example, 1,4 undecanediol dicaproate is a particularly effective plasticizer as is appreciated from the following examples showing compositions prepared by compounding cellulose acetate with varying amounts of 1,4 undecanediol dicaproate to provide products that may be melted and poured into molds or cold drawn into strong and pliable filaments:

*Example A*

A mixture was prepared comprising cellulose acetate and 20% by weight thereof of 1,4 undecanediol dicaproate. This mixture was heated until a homogeneous melt was obtained that poured easily and solidified, on cooling to room temperature, to a transparent pliable material.

*Example B*

Mixtures, similar to that of Example A, were prepared except that the mixtures contained 40% and 80% by weight of 1,4 undecanediol dicaproate. In each case, the mixture was heated until a homogeneous melt was obtained. Each melt poured easily and, on cooling to room temperature, solidified into a transparent, pliable, solid that was more pliable, but of lower tensile strength, than the product of Example A.

Although the 1,4 diols, such as 1,4 undecanediol, have been found to be particularly useful for preparation of esters thereof to provide effective plasticizers, the novel 1,4 diols are also particularly useful for reaction of the two hydroxyl groups, present in each molecule of the diols, with dibasic acids to provide condensation polymers. Thus, for example, reaction of 1,4 undecanediol with succinic acid or sebacic acid has provided low molecular weight polymers that flow at room temperature and are also useful as softening agents.

Although the present invention has been described in conjunction with certain preferred embodiments thereof, those skilled in the art will recognize that variations and modifications can be made. Such variations and modifications can be considered to be within the provision of the specification and the scope of the appended claims.

We claim:

1. A compound corresponding to the formula:

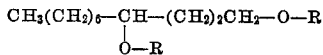

wherein R is the same radical in both instances and is a member selected from the group consisting of hydrogen and an acyl radical.

2. A compound of the formula:

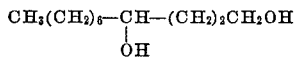

3. A diester of the formula:

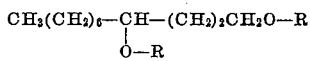

where R is an acyl radical.

4. A compound of the formula:

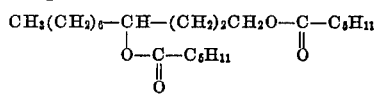

CARL N. ZELLNER.
HERBERT B. GRANHOLM.

REFERENCES CITED

The following references are of record in the file of this patent:

UNITED STATES PATENTS

| Number | Name | Date |
| --- | --- | --- |
| 2,066,533 | Lazier | Jan. 5, 1937 |
| 2,068,415 | Klipstein | Jan. 19, 1937 |
| 2,091,800 | Adkins et al. | Aug. 31, 1937 |
| 2,112,319 | Wickert | Mar. 29, 1938 |
| 2,121,580 | Berliner et al. | June 21, 1938 |
| 2,229,222 | Reid | Jan. 21, 1941 |
| 2,388,688 | Hass | Nov. 13, 1945 |

OTHER REFERENCES

Simmler, "Ber. Deut. Chem.," vol. 39 (1906), pages 2852–2853.

Bray et al. "Jour. Am. Chem. Soc.," vol. 49 (1927), pages 2105–2106.

Chuit, "Helv. Chem. Acta," vol. 9 (1926), page 267.